United States Patent [19]

Kricsfalussy et al.

[11] 3,897,541

[45] July 29, 1975

[54] PROCESS FOR PREPARING PURE CYANOGEN CHLORIDE

[75] Inventors: Zoltan Kricsfalussy, Cologne; Karlheinz Blocher, Leverkusen; Juri Pawlowski, Leverkusen; Bernhard Scherhag, Leverkusen; Raoul Weiler, Leverkusen, all of Germany

[73] Assignee: Bayer Aktiengesellschaft, Leverkusen, Germany

[22] Filed: Nov. 17, 1972

[21] Appl. No.: 307,663

[30] Foreign Application Priority Data

Nov. 23, 1971 Germany............................ 2157973

[52] U.S. Cl................................. 423/379; 423/383
[51] Int. Cl............................................. C01b 21/18
[58] Field of Search.................... 423/379, 383, 486; 252/445, 446, 447

[56] References Cited
UNITED STATES PATENTS

| | | | |
|---|---|---|---|
| 2,962,431 | 11/1960 | Gladrow | 252/444 |
| 3,202,720 | 8/1965 | Hauptschein et al. | 252/444 |
| 3,666,427 | 5/1972 | Enders | 423/379 |

FOREIGN PATENTS OR APPLICATIONS

| | | | |
|---|---|---|---|
| 990,341 | 4/1965 | United Kingdom | 423/383 |

OTHER PUBLICATIONS

Sernagiotto: "Preparation of Cyanogen Chloride," Chemical Abstracts, Vol. 15 (1921), p. 2593.

*Primary Examiner*—Earl C. Thomas
*Attorney, Agent, or Firm*—Burgess, Dinklage & Sprung

[57] ABSTRACT

Pure cyanogen chloride free of water and cyanuric chloride is prepared by reacting gaseous hydrocyanic acid and chlorine gas in the presence of an active carbon catalyst at temperatures of from 500°C to 700°C to form cyanogen chloride and hydrogen chloride and thereafter recovering the pure cyanogen chloride. The active carbon has a specific surface of from about 800 to 1,100 m²/g and the residence time of the reaction gas is between about 0.02 and 2.0 seconds.

7 Claims, No Drawings

PROCESS FOR PREPARING PURE CYANOGEN CHLORIDE

BACKGROUND

This invention relates to a new process for the production of anhydrous cyanogen chloride from the reaction of gaseous hydrocyanic acid with chlorine gas.

It is known that cyanogen chloride can be produced by introducing chlorine into aqueous hydrocyanic acid. Unfortunately, this process produces a moist cyanogen chloride which contains residual chlorine and hydrocyanic acid and a secondary product, hydrogen chloride, as impurities and, therefore requires elaborate purification (cf. British Pat. No. 601,701).

Although it is possible by recycling the aqueous hydrocyanic acid solution to obtain a pure moist cyanogen chloride, the resulting cyanogen chloride still has to be dried before it can be further processed (German Pat. No. 827,358).

Basically the same process is described in French Pat. No. 1,556,676 which comprises simultaneously spraying water into a reaction zone and introducing a gaseous mixture of chlorine and hydrocyanic acid.

All these processes are attended by the serious disadvantage that a dilute aqueous hydrochloric acid, additionally containing the toxic substances cyanogen chloride and hydrocyanic acid, is obtained as a secondary product. This necessitates providing elaborate working-up and purification stages in order to obtain an effluent which satisfies antipollution requirements.

It is also known from DOS No. 1,767,004 that liquid chlorine can be reacted with liquid hydrocyanic acid to form cyanogen chloride with cyanuric chloride and tetrameric cyanogen chloride always being obtained as secondary products. Also the heat of reaction occurring is extremely difficult to dissipate so that the process is not used on a commercial scale.

Heterogeneous catalytic processes are also known starting with gaseous hydrocyanic acid and chlorine gas. Unfortunately, these processes lead to the formation of a mixture of a little cyanogen chloride and a predominate quantity of polymerization products, especially cyanuric chloride. Accordingly, they can only be used in cases where it is intended to produce the secondary products of cyanogen chloride(US Pat. No. 2,965,642).

Accordingly, all the conventional processes for the production of cyanogen chloride are accompanied by serious disadvantages and they are not suitable for the production of pure cyanogen chloride free of cyanuric chloride.

SUMMARY

It has now surprisingly been found that pure cyanogen chloride free of water and cyanuric chloride can be obtained by passing gaseous hydrocyanic acid and gaseous chlorine over a catalyst of active carbon at a temperature in the range of from 500° to 700°C and separating the reaction products cyanogen chloride and hydrogen chloride, by methods known per se.

DESCRIPTION

The fact that the process according to the invention can be carried out at all is particularly surprising because it is known from German Pat. No. 842,067 that dry cyanogen chloride can be catalytically polymerised by active carbon at temperatures above 200°C to form cyanuric chloride. The reaction of gaseous cyanogen chloride and gaseous chlorine on an active carbon with a certain pore volume at a temperature of at least 350°C, preferably at a temperature of from 400° to 470°C, to form cyanuric chloride is also known from tha above cited US Pat. No. 2,965,642. According to US Pat. No. 3,312,697, a small excess, preferably of about 5% by weight, of chlorine and a specific surface of the active carbon of greater than 1000 m$^2$/g (according to BET) are particularly advantageous and lead to a more than 95% conversion of the cyanogen chloride into cyanuric chloride. Accordingly, it is the very freedom from cyanuric chloride of the cyanogen chloride formed which is the particularly surprising aspect of the process according to the invention.

Suitable reaction temperatures for the process according to the invention are in the range of from about 500°C to about 700°C. It is preferred to work at temperatures in the range from about 550°C to about 650°C, more particularly at temperatures in the range from 580° to 625°C. A reaction temperature of about 600°C is particularly preferred. At temperatures below about 500°C, it is possible to detect polymerisation products in the reaction product, especially cyanuric chloride and tetrameric cyanogen chloride, whilst at temperatures above about 700°C there is a reduction in yield.

The active carbons used catalyst in the process according to the invention have a specific surface (measured according to BET (J A C S, 60, (1938) 309) ) of from 800 to 1,100, preferably from 900 to 1050 m$^2$/g. They can be obtained, for example, by grinding an active carbon with a grain size of 4 mm. For example, a BET-surface of about 1,038 m$^2$/g was measured on an active carbon ground to a grain size of from 0.4 to 0.5 mm, whilst a BET-surface of about 965 m$^2$/g was measured on an active carbon ground to a grain size of from 1.5 to 2.0 mm.

In general, the residence times of the reaction gas, based on the catalyst bulk factor, are from 0.02 to 2.0 seconds and preferably between 0.2 and 0.5 second. Shorter or longer residence times can lead to a reduction in yield and to the formation of secondary products.

The starting gases, hydrocyanic acid and chlorine, are used in a molar ratio or substantially 1:1, preferably with a slight excess of chlorine, although a relatively large excess of chlorine is harmless. By contrast, an excess of hydrocyanic acid should be avoided.

The reaction gas leaving the reaction zone can be freed from entrained catalyst particles in known manner, e.g., by cyclones, and separated into its constituents (HCL and cyanogen chloride) by known methods, for example, by total liquefaction and fractional distillation or by fractional liquefaction.

The process according to the invention can also be carried out under elevated pressure, although it is generally carried out in the absence of pressure, i.e., the starting gases are introduced under the pressure which is required to obtain the residence time selected and to overcome the flow resistance of the apparatus.

The utility for cyanogen chloride is well known (see Ullmann's Enzyklopadie der technischen Chemie, 3. Auflage, 1954, Band 5, Seite 665 and Kirk Othmer, Encyclopedia of chemical technology, 3rd ed., Vol. 4, pp. 681, 682, 684, 685).

The following Examples are given as illustrative of the mode of operation which may be employed conducting the invention without limiting it to the precise details set forth.

EXAMPLE 1 a. 29.cc of active carbon (specific surface according to BET 1000 m²/g) are introduced into the test reactor described below and heated under nitrogen for 1 hour at 600°C. Thereafter, the reactor has 1.6 mols/hour of gaseous anhydrous hydrocyanic acid and 1.67 mols/hour of dried chlorine gas passed through it for 11 hours at the same temperature. A volume-time yield of 49 mols of cyanogen chloride per hour per litre of catalyst volume is obtained for a 100% hydrocyanic acid conversion.

b. The test reactor used by way of example consisted of a thermostatically controlled quartz furnace 20 mm in diameter and 300 mm. long. The gaseous starting materials were introduced at the lower end, the reaction product was removed at the upper end of the tube and analysed by IR-spectrophotometry. The content of cyanogen chloride and residual hydrocyanic acid was quantitatively determined by measuring the C—H band at 710 cm$^{-1}$ and the C—N—band at 2210 cm$^{-1}$.

EXAMPLE 2

As in Example 1, 15 cc. of the same catalyst were used and 2.13 mol/hour of hydrocyanic acid and 2.24 mols/hour of chlorine passed through the reactor for 3 hours. For a 98% hydrocyanic acid conversion, the volume-time yield amounted to 126 mols of cyanogen chloride per hour per litre of catalyst volume.

EXAMPLE 3

As in Example 1, 55 cc. of the same catalyst were used and 1.52 mols/hour of hydrocyanic acid and 1.67 mols/hour of chlorine gas were passed through the reactor for 1 hour at 500°C. For a 100% hydrocyanic acid conversion, the volume-time yield amounted to 19.3 mols of cyanogen chloride per hour per litre of catalyst volume.

EXAMPLE 4

As in Example 1, 29 cc. of the same catalyst were used and 2.13 mols/hour of hydrocyanic acid and 2.24 mols/hour of chlorine gas were passed through the reactor for 30 minutes at 600°C. For a 100 % hydrocyanic acid conversion, the volume-time yield amounted to 66.7 mols of cyanogen chloride per hour per litre of catalyst volume.

EXAMPLE 5

As in Example 1, 15 cc. of the some catalyst were used and 2.66 mols/hour of hydrocyanic acid and 2.70 mols/hour of chlorine gas were passed through the reactor for 85 minutes at 600°C. For a 97 % hydrocyanic acid conversion, the volume-time yield amounted to 157 mols of cyanogen chloride per hour per litre of catalyst volume.

What is claimed is:

1. Process for preparing pure cyanogen chloride free of water and cyanuric chloride comprising reacting gaseous hydrocyanic acid with gaseous chlorine gas in the presence of a catalyst consisting essentially of active carbon having a specific surface, measured in accordance with BET, of from 800–1,100 m²/g at temperatures in the range from about 500°C to about 700°C to form a reaction product consisting of cyanogen chloride and hydrogen chloride and thereafter recovering said pure cyanogen chloride.

2. Process of claim 1 wherein the reaction is carried out at temperatures in the range of from 550°C to 650°C.

3. Process of claim 2 wherein the reaction is carried out at temperatures in the range of from 580°c to 625°C.

4. Process of claim 3 wherein the reaction is carried out at a temperature of about 600°C.

5. Process of claim 1 wherein the active carbon catalyst has a specific surface of from 900 to 1,050 m²/g.

6. Process of claim 1 wherein the residence time of the reaction gases based on the bulk factor of said catalyst is within the range of from about 0.02 to about 2.0 seconds.

7. Process of claim 6 wherein the residence time of the reaction gases based on the bulk factor of said catalyst is within the range of from 0.2 to 0.5 second.

* * * * *